(12) United States Patent
Ugur et al.

(10) Patent No.: US 9,731,357 B2
(45) Date of Patent: Aug. 15, 2017

(54) HOLE-MAKING SYSTEM

(71) Applicant: Aygaz Anonim Sirketi, Istanbul (TR)

(72) Inventors: Rahmi Ugur, Izmit (TR); Kerem Kadayifcioglu, Istanbul (TR); Emrah Isbilen, Istanbul (TR)

(73) Assignee: Aygaz Anonim Sirketi, Istanbul (TR)

( * ) Notice: Subject to any disclaimer, the term of this patent is extended or adjusted under 35 U.S.C. 154(b) by 0 days.

(21) Appl. No.: 15/078,568

(22) Filed: Mar. 23, 2016

(65) Prior Publication Data
US 2016/0221089 A1      Aug. 4, 2016

Related U.S. Application Data

(63) Continuation of application No. PCT/TR2015/000269, filed on Jul. 1, 2015.

(30) Foreign Application Priority Data

Oct. 17, 2014    (TR) ................ a 2014 12220

(51) Int. Cl.
*B23B 41/00*     (2006.01)
*B23B 45/00*     (2006.01)
(Continued)

(52) U.S. Cl.
CPC .............. *B23B 41/00* (2013.01); *B23B 45/00* (2013.01); *B23B 45/001* (2013.01); *B23B 45/04* (2013.01);
(Continued)

(58) Field of Classification Search
CPC ..... B23B 41/00; B23B 41/10; B23B 1245/00; B23B 41/12; B23B 45/001;
(Continued)

(56) References Cited

U.S. PATENT DOCUMENTS 1,433,387 A * 10/1922 Leckinger ............... B23B 39/00
                                                         408/235
1,466,128 A *  8/1923 Hallenbeck ............. B23Q 5/32
                                                         408/134
(Continued)

FOREIGN PATENT DOCUMENTS

CN        201329435 Y  * 10/2009
FR          636172 A      4/1928
(Continued)

OTHER PUBLICATIONS

International Search Report and Written Opinion, dated Oct. 28, 2015, pp. 1-10, issued in International Patent Application No. PCT/TR2015/000269, European Patent Office, Rijswijk, The Netherlands.

*Primary Examiner* — Sunil K. Singh
*Assistant Examiner* — Nicole N Ramos
(74) *Attorney, Agent, or Firm* — Brinks Gilson & Lione

(57) ABSTRACT

A hole-making system for making holes on the collar of a cylinder is provided. The hole making system includes a hand unit for making holes on the collar of the cylinder and the hand unit being configured to be used with two hands. The hole making system further includes a control unit configured to control operation of the hand unit. The hole making system further includes a pedal configured to enable a user to control the operation of the hand unit with a foot. The hand unit is held and controlled with two hands and a drilling command is provided by the pedal, allowing the user to control the hand unit in a more reliable manner.

14 Claims, 3 Drawing Sheets

(51) Int. Cl.
  *B25F 5/00*     (2006.01)
  *B25H 1/00*     (2006.01)
  *B23B 45/04*    (2006.01)
  *F17C 13/00*    (2006.01)

(52) U.S. Cl.
  CPC .............. B25F 5/00 (2013.01); B25H 1/0021 (2013.01); B25H 1/0028 (2013.01); F17C 13/003 (2013.01); *B23B 2270/027* (2013.01); *B23B 2270/08* (2013.01); *F17C 2201/0104* (2013.01); *F17C 2201/032* (2013.01); *F17C 2201/058* (2013.01); *F17C 2205/0308* (2013.01); *F17C 2205/05* (2013.01); *F17C 2221/035* (2013.01); *F17C 2223/0153* (2013.01); *F17C 2223/033* (2013.01); *F17C 2270/0745* (2013.01); *Y10T 408/16* (2015.01); *Y10T 408/5623* (2015.01); *Y10T 408/56245* (2015.01)

(58) Field of Classification Search
  CPC .............. B23B 1245/04; Y10T 408/16; Y10T 408/165; Y10T 408/96; Y10T 408/5623; Y10T 408/56245; Y10T 408/564; Y10T 408/5647; Y10T 408/6757; Y10T 408/91; Y10T 408/92
  See application file for complete search history.

(56) References Cited

U.S. PATENT DOCUMENTS

| | | | | |
|---|---|---|---|---|
| 1,556,855 A | * | 10/1925 | Lewis | B25B 27/0021 408/136 |
| 1,577,975 A | * | 3/1926 | Klausmeyer | B23Q 5/58 408/135 |
| 2,278,741 A | * | 4/1942 | Rylander | B21J 15/20 72/441 |
| 2,576,801 A | * | 11/1951 | Michael | G04D 3/0002 269/249 |
| 2,737,065 A | * | 3/1956 | Piersall | B25H 1/0042 408/712 |
| 2,831,376 A | * | 4/1958 | Daniels | B25H 1/0078 408/112 |
| 3,260,138 A | * | 7/1966 | Frizzell | B25H 1/0057 408/99 |
| 3,384,321 A | * | 5/1968 | Becker | B66D 1/02 242/372 |
| 3,538,794 A | * | 11/1970 | Grundmeyer | B25H 1/0057 408/92 |
| 4,521,140 A | * | 6/1985 | Doescher | B23B 47/287 408/108 |
| 5,245,735 A | * | 9/1993 | Tanashian | B23B 39/161 29/26 A |
| 5,890,523 A | * | 4/1999 | Johnson | B25H 1/0028 144/1.1 |
| 6,799,643 B2 | * | 10/2004 | Voulkidis | B25D 11/00 173/11 |
| 2005/0161241 A1 | * | 7/2005 | Frauhammer | B25F 5/026 173/1 |
| 2010/0043618 A1 | * | 2/2010 | Katzenberger | B23Q 9/0042 83/875 |

FOREIGN PATENT DOCUMENTS

| | | |
|---|---|---|
| FR | 2706581 A1 | 12/1994 |
| FR | 2762241 A1 | 10/1998 |
| GB | 931193 | 7/1963 |
| WO | WO 98/18390 A1 | 5/1998 |

* cited by examiner

HOLE-MAKING SYSTEM

CROSS-REFERENCE

The present application is a continuation application of, and claims priority under 35 U.S.C. §120 to Patent Cooperation Treaty Application No. PCT/TR2015/000269, "A Hole-Making System", filed Jul. 1, 2015, which is incorporated by reference in its entirety, and which claims priority to Turkish Patent Application No. TR 2014/12220, filed Oct. 17, 2014.

TECHNICAL FIELD

The present disclosure relates to hole-making systems used for making holes on collars provided on the holding portions of the pressurized cylinders such as LPG cylinders.

BACKGROUND

Pressurized cylinders such as LPG cylinders comprise labels for inscribing certain information (i.e. date of production, date of filling, number of filling etc.) on the cylinders. Said labels are mainly positioned on the collar (preferably at the inner side of the collar) connecting the holding portion and body of the cylinders each other. In order to attach the label to the collar, at least one hole must be made on the said collar. In the prior art, one of the common applications utilized to make holes on a plate is to use a drill. However, sparkles may occur in making holes with the use of a drill, so such applications are not suitable for use in cylinders containing combustible gas such as LPG.

BRIEF SUMMARY

In embodiments, there is provided a hole-making system for making holes on a cylinder collar. The said hole-making system comprises at least one hand unit for making holes on said cylinder collar and used with two hands; at least one control unit controlling operation of the said hand unit; and at least one pedal enabling the user to control the operation of the hand unit with his foot.

In the cylinder drilling system, the hand unit is held and controlled with two hands and a drilling command is provided by means of a pedal and thus the users are allowed to control the hand unit in a more reliable manner. Hence, user-related errors are minimized in the drilling process.

An aspect of embodiments is to provide a hole-making system for making holes on collars of the pressurized cylinders.

Another aspect of embodiments is to provide a hole-making system for making holes in a cylinder collar in a fast and reliable manner.

BRIEF DESCRIPTION OF THE DRAWINGS

The exemplary embodiments of the hole-making system are illustrated in the enclosed drawings, in which.

Figure 1:
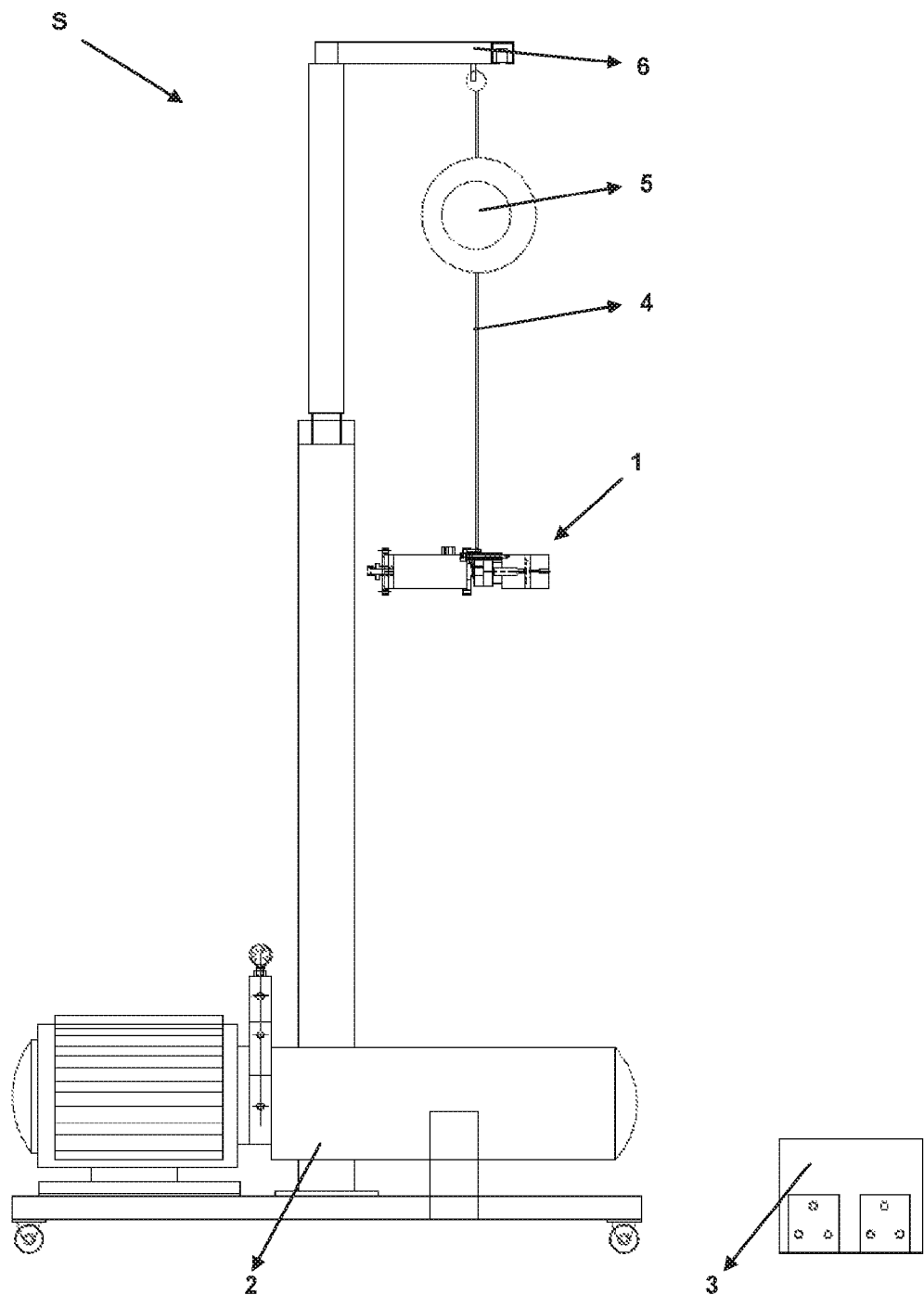
FIG. 1 is a front view of a hole-making system.

All the parts illustrated in the figures are individually assigned a reference numeral and the corresponding terms of these numbers are listed as follows:
Hole-making system (S)
Cylinder (T)
Hand unit (1)
Control unit (2)
Pedal (3)
Cord (4)
Load compensating member (5)
Frame (6)
Collar (7)
Movable belt (8)
Body (9)
Drilling head (10)
Recess (11)
Drilling member (12)
Holding handle (13)
Power connection (14)
Fixing member (15)
Safety cover (16)
Safety seat (17)

DETAILED DESCRIPTION

In order to provide the pressurized cylinders such as LPG cylinders with certain information, labels are attached on the collars of the cylinders. In order to attach the said labels on the collar of the cylinder, a hole must be made on the collar. However, especially in cases where the cylinder contains combustible gas, the hole-making process should have an ex-proof design. Therefore a hole-making system is provided for making holes on collars of cylinders in a reliable and fast manner.

Figure 2:
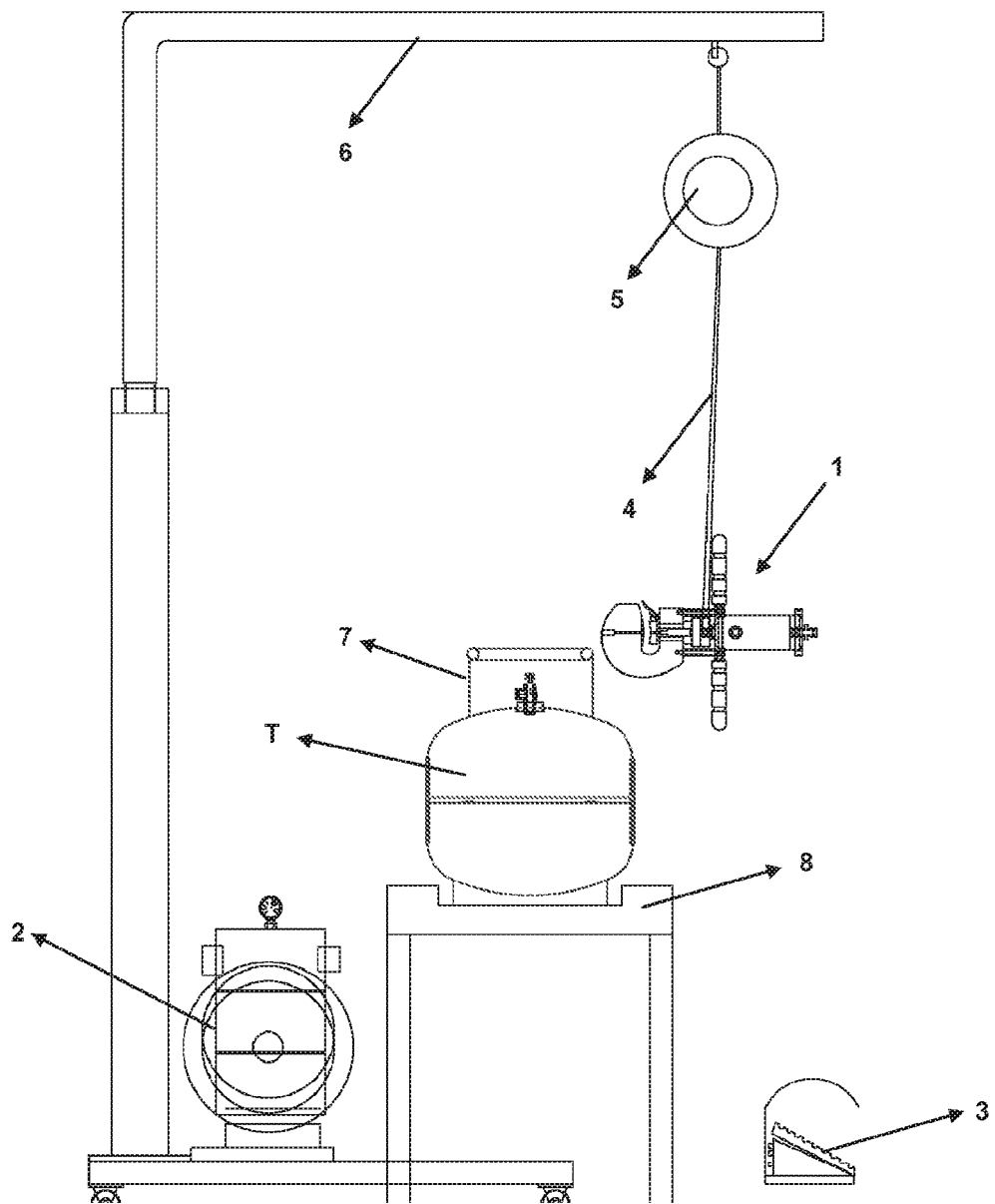
FIG. 2 is a side view of a hole-making system.

The hole making system (S), as illustrated in FIGS. 1 and 2, comprises at least one hand unit (1) for making holes on the collar (7) of a cylinder (T) and preferably used with two hands; at least one control unit (2) controlling operation of the said hand unit (1); and at least one pedal (3) enabling the user to control the operation of the hand unit with his foot.

Figure 3:
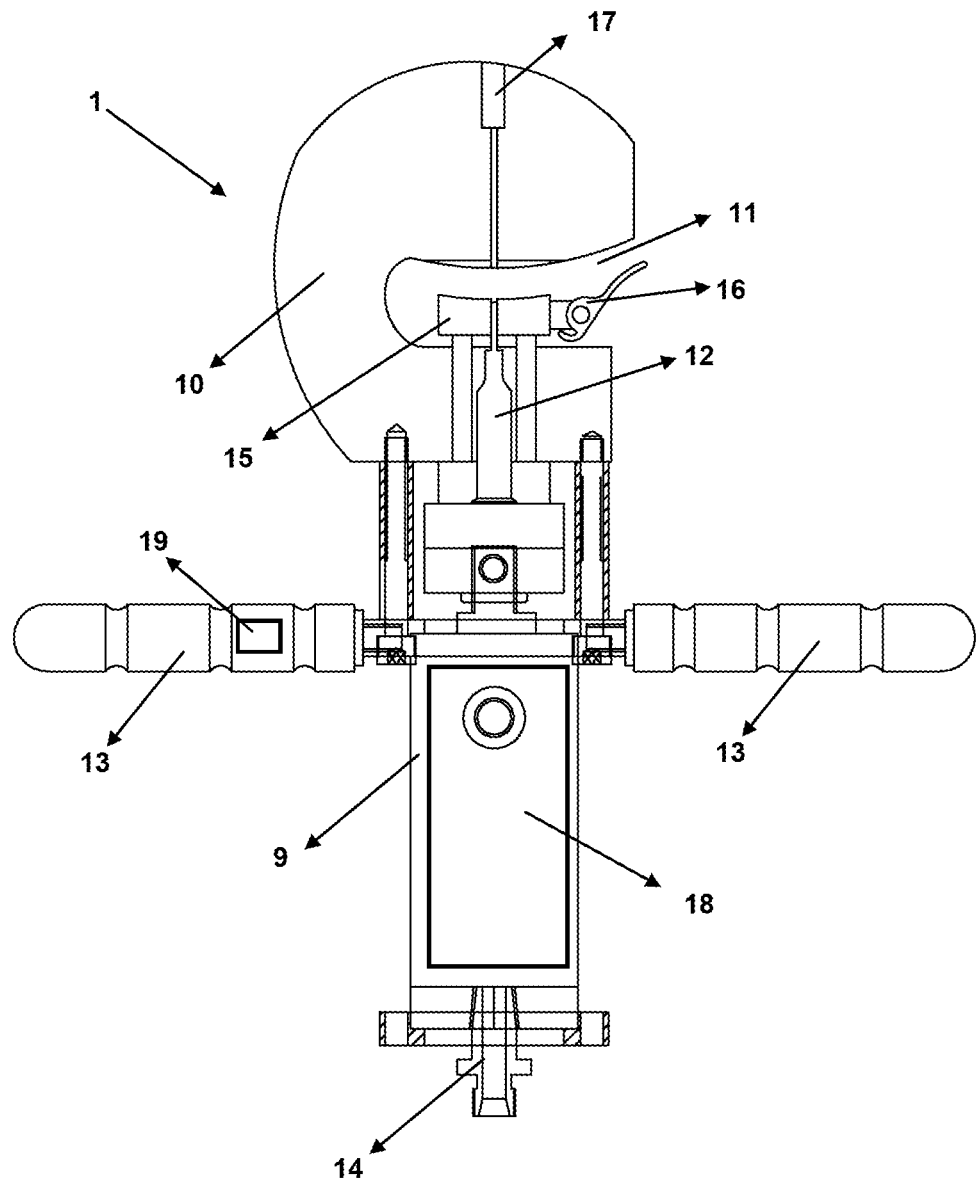
FIG. 3 is a plan sectional view of a hand unit utilized in a hole-making system.

The hand unit (1), as detailed in FIG. 3, comprises at least one body (9); at least one hook-shaped drilling head (10) which is connected to the body (9) and wherein said collar (7) is placed into at least one recess (11) thereof; at least one drilling member (12) suitable for moving in the said drilling head (10) such that it passes through the recess (11) and, thus, for making a hole on the collar (7) located in the recess (11); at least two holding handles (13) located on the body (9) and enabling the user to hold the hand unit (1) with two hands; and at least one power connection (14) allowing power transfer from the control unit (2) to the hand unit (1). The movement of the said drilling member (12) is controlled by means of the control unit (2) and pedal (3).

In illustrative embodiments, the user moves the hand unit (1) with his two hands, thereby making the collar (7) to be holed to place in the said recess (11). When the collar (7) is placed into the recess, the user moves the drilling member (12) by pressing against the pedal (3). With the movement of the drilling member (12), a hole is made on the collar (7). After the drilling member (12) is returned to its original position (i.e. with the removal of the user's foot from the pedal (3)) the user moves the hand unit (1) so as to detach it from the collar (7). In this way, the drilling process is made in a fast and reliable manner.

In illustrative embodiments, the said hand unit (1) comprises at least one piston (18) that moves the drilling member (12). In this embodiment, the said control unit (2) comprises at least one compressor applying pressure on the piston (18). Also in this embodiment, the said power connection (14) is configured to transfer the pressure received from the control unit (2) to the piston (18) (i.e. a pneumatic piston). With embodiments comprising a piston (18), the drilling process is performed in an easy and effective manner.

In embodiments, each holding handle (13) comprises at least one sensor (19) sensing existence of the hand of the user. Said sensors (19) are preferably in the form of a distance sensor or a switch. In this embodiment, if at least one hand of the user is not detected by the sensors (19), even if the said pedal (3) is used, the drilling process is not performed. Therefore, the users are prevented from using the hole-making system (S) without using the two hands.

In embodiments, the hole-making system (S) comprises at least one frame (6) carrying the hand unit (1) and at least one cord (4) connecting the hand unit (1) to the frame (6). The said hole-making system (S) also comprises at least one load compensating member (5) which is located on the said cord (4) and which compensates the weight of the hand unit (1). The said load compensating member (5) preferably comprises a spring reel system compensating the weight of the hand unit (1). Thus, the user may control the hand unit (1) in a reliable and fast manner without feeling the weight of the hand unit (1).

In embodiments, the hand unit (1) comprises at least one fixing member (15) that compresses the collar (7) between itself and the drilling head (10), after the collar (7) has been placed into the recess (11), in order to fix the collar (7). The said fixing member (15) prevents the collar (7) from moving in the recess (11) especially during the drilling process, thereby allowing a reliable drilling process.

In embodiments, the hand unit (1) comprises at least one safety cover (16) preventing access to the recess (11), after the collar (7) has been placed into the recess (11). After the collar (7) has been placed into the recess (11), the said safety cover (16) moves so as to close the inlet of the recess (11). In this way, a foreign substance (i.e. clothes or hands of the user) is prevented from sliding into the recess (11) so that a more reliable drilling process is performed.

In embodiments, the said hand unit (1) comprises at least one safety seat (17) located along the drilling head (10) and in alignment with the drilling member (12). In this embodiment, in case of a breakage of the drilling member (12) during the drilling process, the broken part can be removed by intervening from inside of the safety seat (17). In this manner, even in case of a breakage of the drilling member (12), the hand unit (1) is made re-usable in a short period of time.

In embodiments, the hole-making system (S) comprises at least one movable belt (8) on which the cylinders (T) are placed and which moves the cylinders (T) placed thereon along a line. In this embodiment, the cylinders (T) reaches to the hand drilling unit (1) so as to be drilled on the collar and transferred to another station at the end of the drilling process. In this way, the drilling process is performed in a swift manner.

In embodiments of the cylinder hole-making system (S), the hand unit (1) is held and controlled with two hands and a drilling command is provided by means of a pedal (3) and thus the users are allowed to control the hand unit (1) in a more reliable manner. Hence, user-related errors are minimized in the drilling process.

The invention claimed is:

1. A hole-making system for making holes on a collar of a cylinder, comprising;
   a hand unit configured to make holes on the collar of the said cylinder, the hand unit being configured to be used with two hands;
   a control unit configured to transfer power to the hand unit;
   a pedal configured to control movement of a drilling member within the hand unit with a foot; and
   wherein said hand unit comprises a body; a hook-shaped drilling head connected to the body, wherein said collar is placed into a recess thereof; the drilling member configured to move through a curved surface of said drilling head so as to pass through the recess and make a hole on the collar located in the recess; a fixing member that, in response to the collar being placed into the recess, is configured to compress the collar between the fixing member and the drilling head to fix the position of the collar; at least two holding handles located on the body and configured to enable holding of the hand unit with two hands; and a power connection configured to allow power transfer from the control unit to the hand unit.

2. The hole-making system according to claim 1, wherein said hand unit comprises a piston configured to move the drilling member.

3. The hole-making system according to claim 2, wherein said control unit comprises a compressor configured to apply pressure on the piston.

4. The hole-making system according to claim 1, wherein each of the at least two holding handles comprises a sensor configured to sense an existence of a hand of a user.

5. The hole-making system according to claim 4, wherein said sensor is a distance sensor.

6. The hole-making system according to claim 4, wherein said sensor is a switch.

7. The hole-making system according to claim 1, further comprising a frame carrying the hand unit and a cord connecting the hand unit to the frame.

8. The hole-making system according to claim 7, further comprising a load compensating member located on said cord, the load compensating member being configured to compensate for the weight of the hand unit.

9. The hole-making system according to claim 8, wherein the load compensating member comprises a spring reel system configured to compensate for the weight of the hand unit.

10. The hole-making system according to claim 1, wherein the hand unit comprises a safety cover configured to prevent access to the recess after the collar has been placed into the recess.

11. The hole-making system according to claim 1, wherein the hand unit comprises a safety seat located along the drilling head and in alignment with the drilling member.

12. The hole making system according to claim 1, wherein the fixing member comprises a curved surface configured to contact the collar within the recess.

13. A hole-making system for making holes on a collar of a cylinder, comprising;
   a hand unit configured to make holes on the collar of the said cylinder, the hand unit being configured to be used with two hands;
   a control unit configured to transfer power to the hand unit;
   a pedal configured to control movement of a drilling member within the hand unit with a foot; and
   wherein said hand unit comprises a body; a hook-shaped drilling head connected to the body, wherein said collar is placed into a recess thereof; the drilling member configured to move within said drilling head so as to pass through the recess and make a hole on the collar located in the recess; a fixing member that, in response to the collar being placed into the recess, is configured to compress the collar between the fixing member and the drilling head to fix the position of the collar, the fixing member including a curved surface configured to contact the collar within the recess; at least two holding handles located on the body and configured to enable holding of the hand unit with two hands; and a power connection configured to allow power transfer from the control unit to the hand unit.

14. The hole-making system according to claim 13, wherein the drilling head further comprises a curved surface facing the recess and configured to receive the drilling member.

* * * * *